June 27, 1950 E. FIELDS 2,512,890
TOY TRACK SYSTEM AND TOY VEHICLE
Filed July 10, 1947 2 Sheets-Sheet 1

INVENTOR
ERNEST FIELDS
BY
ATTORNEY

June 27, 1950            E. FIELDS            2,512,890

TOY TRACK SYSTEM AND TOY VEHICLE

Filed July 10, 1947            2 Sheets-Sheet 2

INVENTOR
ERNEST FIELDS
BY
ATTORNEY

Patented June 27, 1950

2,512,890

UNITED STATES PATENT OFFICE 2,512,890

TOY TRACK SYSTEM AND TOY VEHICLE

Ernest Fields, New York, N. Y.

Application July 10, 1947, Serial No. 760,080

6 Claims. (Cl. 104—63)

This invention relates to toy track systems and to vehicles for such track systems, particularly to track systems on which one or more motor driven vehicles will travel along a predetermined route.

One object of the invention is to provide a track system which causes a vehicle to travel along a route which changes repeatedly during a complete cycle of travel of a vehicle over the track system.

Another object of the invention is to provide a track system which causes a vehicle to change its route of travel in an unexpected manner.

Another object of the invention is to provide a track system which causes an observer, particularly a child, to be surprised and deceived as to the route of travel of a vehicle over the track system.

Another object of the invention is to provide means permitting an operator of the toy to stop and release at will a vehicle placed on the track system.

Another object of the invention is to provide a vehicle capable of performing the previously mentioned unexpected route changes.

Other and further objects, features and advantages of the invention will appear hereinafter in the specification and the appended claims forming a part of the application.

According to a now preferred embodiment of the invention, the above enumerated and other objects of the invention are attained by providing a track system comprising a substantially straight track section to which are joined at both ends substantially circular or slightly spiral shaped track sections intersecting each other and having gradually decreasing diameters. These substantially circular track sections are continued to again intersect with each other and to form inner substantially circular open track sections substantially parallel to the outer substantially circular track sections. The ends of the inner track sections are finally joined by a substantially straight track section so that a continuous track system is formed. The intersections of the track sections and any other desired portion of the system are concealed by hollow bodies simulating buildings, mountain formations, etc. The track system may also enclose stop and release means permitting to stop or release a motor driven vehicle placed on the track system.

According to a now preferred embodiment of the invention, a vehicle intended to travel on the previously referred to track system comprises a movement which drives at least one of the wheel pairs. Each pair of wheels is mounted at an angle relative to the longitudinal axis of the vehicle, said angles being so selected that they constitute part of the periphery of a circle having approximately the same diameter as said substantially circular track sections.

In the accompanying drawings a now preferred embodiment of the invention is shown by way of illustration and not by way of limitation.

Figure 1:
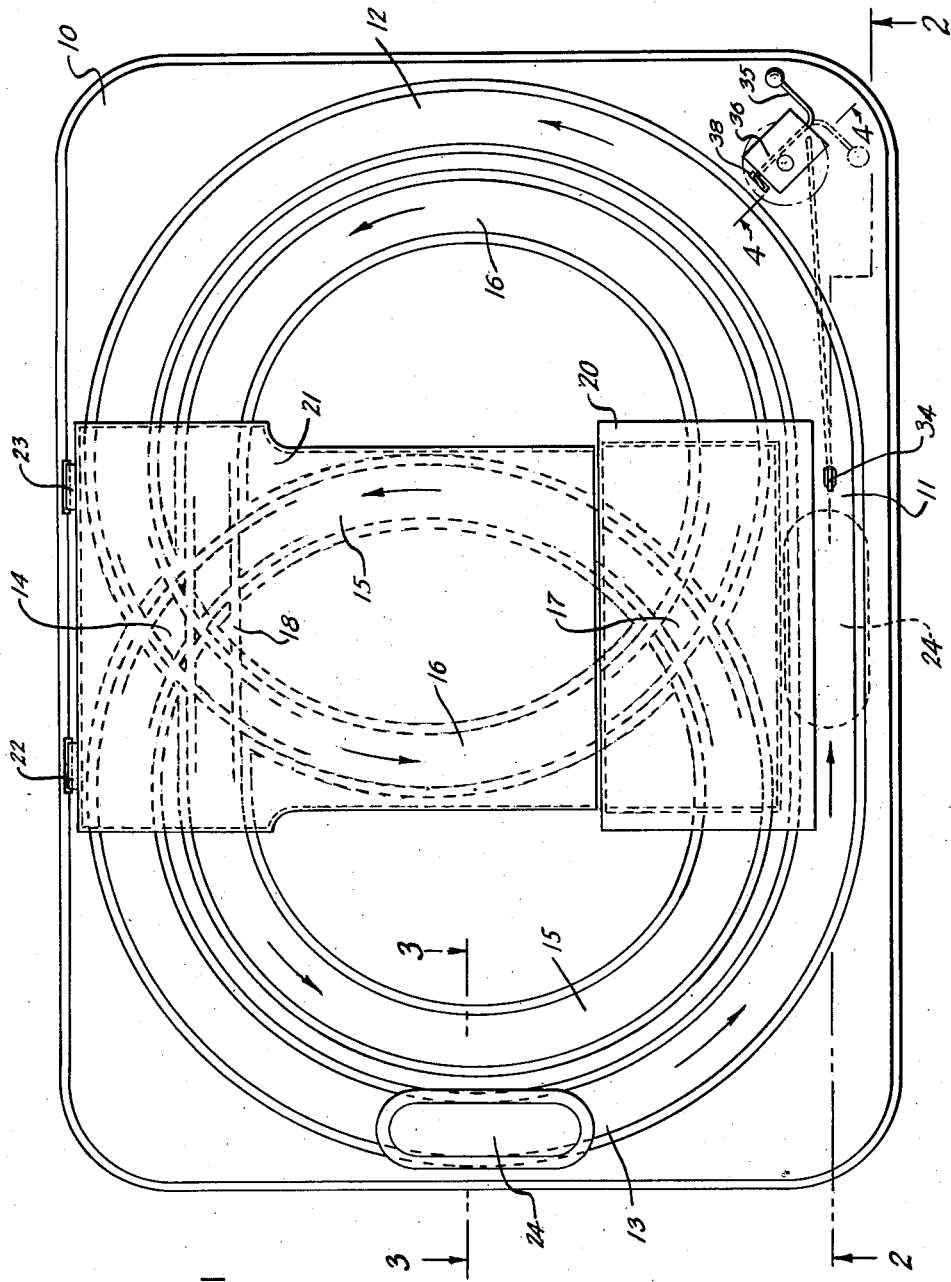
Fig. 1 is a plan view of a toy track system and a vehicle according to the invention.

Referring now to the drawings in detail, the toy track system according to the invention comprises a base plate 10 made of any suitable material such as sheet metal. On this plate, a plurality of track sections are provided formed by any suitable means, for instance by pressing grooves into the plate or by raising portions of the plate. It is of course also possible to fasten tracks to the plate or to provide separate tracks resting on any suitable surface and shaped according to the invention. The term "tracks" as used herein, is intended to designate any kind of means for guiding a vehicle along a predetermined route; it shall also include systems which guide a vehicle by forming a simulated road bed.

The track sections comprise an intermediate section shown as a substantially straight section 11 to which is joined at one end a substantially circular or more accurately slightly spiral shaped section 12. Similarly, a circular or more accurately slightly spiral shaped track section 13, is joined to the other end of straight track section 11. Track sections 12 and 13 are so positioned that they intersect each other at 14. The diameters of the substantially circular track sections are gradually reduced so that inner, substantially circular sections 15 and 16 respectively, are formed. The inner substantially circular sections intersect at 17 located oppositely to intersection 14. The ends of inner substantially circular track sections 15 and 16 are finally joined by a second intermediate section shown as a substantially straight track section 18. As a result, a continuous track system is formed as can best be seen on Fig. 1.

Figure 3:
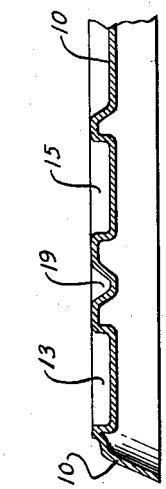
Fig. 3 is a section along line 3—3 of Fig. 1.

Fig. 3 shows a suitable manner in which the track sections may be formed on base plate 10. As will be seen on Fig. 3, a groove at the outside of the base plate forms outer substantially circular track section 13 and a second groove forms inner substantially circular track section 15. A narrow groove 19 may be provided between the two grooves 13 and 15 to stiffen base plate 10.

The two intersections 14 and 17 are concealed by any suitable non-transparent or opaque hollow bodies placed over the same and having openings for passage of a vehicle on the track system. The hollow bodies may be of any suitable shape and design, for instance a hollow body 20 concealing intersection 17 may be in the shape of a station house and a second hollow body 21 may simulate a mountain formation. It will be obvious that the hollow bodies 20 and 21 must be shaped to permit a travel of a vehicle over the track sections covered by the same.

The hollow members may be fastened directly to the base plate or may be hinged thereto as indicated for hollow body 21 by hinges 22 and 23.

Figure 2:
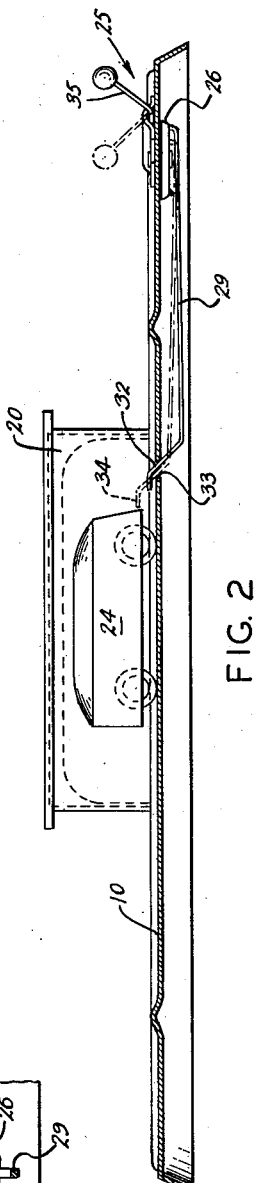
Fig. 2 is a section along line 2—2 of Fig. 1.
Figure 4:
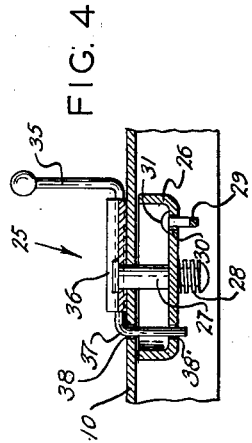
Fig. 4 is a section along line 4—4 of Fig. 1.

To permit a convenient stopping and releasing of a vehicle 24 placed on the track system, a stop and release device is provided, generally designated by 25. As best can be seen on Fig. 4, this device comprises a preferably cup-shaped disc 26 pivoted to the bottom side of base plate 10 by means of a pivot 27. A spring 28 may be provided to bias disc 26 against plate 10. A stop rod 29 is eccentrically and pivotally hinged to disc 26, for instance by inserting the bent-off end of rod 29 through a hole 30 in disc 26 and providing an enlarged head 31 at the rod. The distal end of rod 29 is bent-off to form a section 32 extended through a suitable opening 33 in base plate 10. The protruding end of rod section 32 may again be bent off to form a section 34. Disc 26 can be rotated by means of a handle or lever 35 pivotally supported on plate 10 by any suitable means such as a box 36 through which lever 35 is passed as can best be seen on Fig. 4. The portion of lever 35 extending from box 36 is bent to form an extension 37. This extension is passed through an elongated slot 38 in plate 10 and hinged pivotally and eccentrically to disc 26 by means of a hole 38' therein. As a result, a tilting of lever 35 about its bearing in box 36 will cause a limited angular rotation of disc 26. As will be apparent, a rotation of the disc will cause section 32 of rod 29 to extend more or less through hole 32. The lengths and position, of the described parts of device 25 are so selected that rod section 34 will clear the body of vehicle 24 when lever 35 is in its position shown in full lines, while a placement of lever 35 in the position shown in dotted lines will cause rod 29 to assume its dotted position. In this latter position rod, section 34 will abut against the body of a vehicle placed on the track system, thereby arresting the same (assuming the vehicle is arranged for travel from left to right of Fig. 2).

Figure 5:
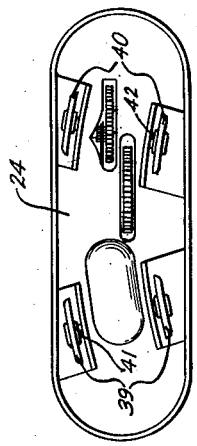
Fig. 5 is a bottom view of a vehicle according to the invention.

Fig. 5 shows the bottom view of a vehicle to be used in connection with a track system according to Fig. 1. The vehicle is equipped with a conventional movement, such as a spring wound motor, the details of which are not essential for the understanding of the invention and are therefore not described here in detail. The body proper of the vehicle may have any suitable shape, for instance to simulate a railroad car or an automobile, but it is of course also possible to give the body the shape of an animal or a human figure.

According to the invention, the front and rear wheels 39 and 40 respectively, of the vehicle are mounted at an angle to the longitudinal axis of the vehicle so that the planes of the wheels are located substantially on the periphery of a circle having approximately the same diameter as the inner and outer circular track sections. It will of course be understood that a high accuracy is not required and that a diameter between the diameters of the inner and outer circular track sections may be selected. The wheel axles 41 and 42 can be mounted at a fixed angle or may be guided in slotted bearings permitting a certain play of the wheel axles. It will be evident that the purpose of the angular positions of the wheels is to permit the vehicle to follow easily the curvatures of the track system.

The toy track system according to the invention operates as follows:

Let it be assumed that a wound car 24 is placed in the position shown on Fig. 1 in full lines and that the device 25 is set for stopping. Then, the vehicle will come to a stop in the position shown in dotted lines. When the vehicle is now released by means of handle 35, the same will travel in the direction indicated by the arrows, first along the straight track section 11, then along outer substantially circular section 12 until it disappears under mountain formation 21. While concealed by formation 21, it will continue to travel over the left hand portion of substantially circular track section 16 still concealed by body 21 and later on by station house 20. It will emerge from house 20 travelling on the right hand portion of inner substantially circular track section 16. In other words, the vehicle will reappear from station house 20 instead from mountain formation 21 into which it disappeared. The vehicle will continue on the right hand portion of track section 16 and disappear travelling on track section 15 until it enters station house 20. Instead of reappearing from the station house it will continue on the concealed right hand portion of track section 15 and reappear from the mountain formation travelling on outer substantially circular track section 13.

The previously described route of a vehicle is quite baffling, particularly to a child who will be continuously surprised by the disappearance and reappearance of the vehicle in an unexpected direction and on an unexpected track section.

Instead of employing one vehicle, it is of course also practical to use a train pulled by an engine. Furthermore, in certain instances, motor driven vehicles may be operated simultaneously on the track system.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. In a toy track system, the combination of a plurality of track sections positioned in the same plane and including an intermediate track section, one substantially circular track section joined to each end of said intermediate track section, the diameters of said substantially circular track sections being gradually decreased, said substantially circular track sections being continued to form each an outer substantially circular track portion and an inner substantially circular track portion, said inner substantially circular track portions facing each other spaced apart, a second intermediate track section joining the ends of said inner substantially circular track portions to constitute a continuous track system, and a substantially opaque hollow body shaped and positioned to conceal said intermediate track sections, the walls of said hollow body including openings to permit passage of a vehicle through and within the hollow body.

2. In a toy track system, the combination of a plurality of track sections positioned in the same plane and including a substantially straight track section, one substantially circular track section joined to each end of said straight track section, the diameters of said substantially circular track sections being gradually decreased, said substantially circular track sections being continued to form each an outer substantially circular track portion and an inner substantially circular track portion, said inner substantially circular track portions ending facing each other spaced apart, said outer substantially circular track portions being positioned to intersect each other and said inner substantially circular track portions being positioned to intersect each other, a second substantially straight track section joining the ends of said inner substantially circular track portions to constitute a continuous track system, and an opaque hollow body shaped and positioned to conceal said intersections, the walls of said hollow body including openings to permit a passage of a vehicle through and within the body.

3. In a toy track system, a plurality of track sections positioned in the same plane and including a substantially straight track section, one substantially circular track section joined to each end of said straight track section, the diameters of said substantially circular track sections being gradually decreased, said substantially circular track sections being continued to form each an outer substantially circular track portion and an inner substantially circular track portion, said inner substantially circular track portions ending facing each other spaced apart, said outer substantially circular track portions being positioned to intersect each other and said inner substantially circular track portions being positioned to intersect each other, a second substantially straight track section joining the ends of said inner substantially circular track portions to constitute a continuous track system, an opaque hollow body shaped and positioned to conceal said intersections, the walls of said hollow body including openings to permit a passage of a vehicle through and within said body, in combination with a vehicle arranged to travel on said track system, said vehicle comprising a movement for propelling said vehicle, the wheels of said vehicle being mounted at an angle to the longitudinal axis of the vehicle so as to be positioned on the periphery of a circle having substantially the same diameter as said substantially circular track sections.

4. In a toy track system, the combination of a base plate, a plurality of track sections formed on said base plate in the same plane, said track sections including an intermediate track section, one substantially circular track section joined to each end of said intermediate track section, the diameters of said substantially circular track sections being gradually decreased, said substantially circular track sections being continued to form each an outer substantially circular track portion and an inner substantially circular track portion, said inner substantially circular track portions ending facing each other spaced apart, said outer substantially circular track portions being positioned to intersect each other and said inner substantially circular track portions being positioned to intersect each other, a second intermediate track section joining the ends of said inner substantially circular track portions to constitute a continuous track system, and an opaque hollow body supported on said base plate and positioned to conceal said intersections, said hollow body including openings permitting a passage of a vehicle through and within the body.

5. A toy track system as described in claim 4, wherein said hollow body comprises two separate structures, one structure simulating a building and concealing one track intersection, the second structure simulating a mountain formation and concealing the other track intersection.

6. A toy track system as described in claim 4, wherein said hollow body comprises two separate structures, one structure fixedly secured to the base plate, the other structure hinged to the base plate, each of said structures positioned to conceal one of said track intersections, said hinged structure being shaped to conceal also the part of each circular track section leading from the respective outer substantially circular track portion thereof to the respective inner substantially circular track portion thereof.

ERNEST FIELDS.

REFERENCES CITED

The following references are of record in the file of this patent:

UNITED STATES PATENTS

| Number | Name | Date |
|---|---|---|
| 935,780 | Dahlin et al. | Oct. 5, 1909 |
| 1,022,419 | Hornby | Apr. 9, 1912 |
| 1,089,799 | Spelling | Mar. 10, 1914 |
| 1,806,102 | Traver | May 19, 1931 |
| 1,911,241 | Rosenthal | May 30, 1933 |
| 1,911,242 | Rosenthal | May 30, 1933 |
| 2,216,497 | McHenry | Oct. 1, 1940 |
| 2,416,473 | Fields | Feb. 25, 1947 |